United States Patent
Anthonisamy et al.

(10) Patent No.: US 9,015,519 B2
(45) Date of Patent: Apr. 21, 2015

(54) METHOD AND SYSTEM FOR CLUSTER WIDE ADAPTIVE I/O SCHEDULING BY A MULTIPATHING DRIVER

(75) Inventors: Frederick Bosco Anthonisamy, Sunnyvale, CA (US); Suhas Ashok Dantkale, Sunnyvale, CA (US)

(73) Assignee: Symantec Corporation, Mountain View, CA (US)

( * ) Notice: Subject to any disclaimer, the term of this patent is extended or adjusted under 35 U.S.C. 154(b) by 403 days.

(21) Appl. No.: 13/363,075

(22) Filed: Jan. 31, 2012

(65) Prior Publication Data

US 2013/0198562 A1 Aug. 1, 2013

(51) Int. Cl.
*G06F 11/00* (2006.01)
*G06F 11/20* (2006.01)
*H04L 12/24* (2006.01)

(52) U.S. Cl.
CPC ............ *G06F 11/2005* (2013.01); *G06F 11/20* (2013.01); *G06F 11/2089* (2013.01); *H04L 41/0668* (2013.01); *H04L 41/12* (2013.01)

(58) Field of Classification Search
CPC .............. G06F 3/0631–3/0635; G06F 3/0689; G06F 3/0613; G06F 2003/06; G06F 2211/1054; G06F 11/006; G06F 11/0176
USPC ......... 704/3, 4.1, 15, 4.11; 709/203, 219, 223
See application file for complete search history.

(56) References Cited

U.S. PATENT DOCUMENTS

| | | | | |
|---|---|---|---|---|
| 5,615,329 | A * | 3/1997 | Kern et al. | 714/6.12 |
| 5,675,723 | A * | 10/1997 | Ekrot et al. | 714/4.3 |
| 5,768,623 | A * | 6/1998 | Judd et al. | 710/37 |
| 6,343,324 | B1 * | 1/2002 | Hubis et al. | 709/229 |
| 6,349,357 | B1 * | 2/2002 | Chong, Jr. | 711/111 |
| 6,370,605 | B1 * | 4/2002 | Chong, Jr. | 710/33 |
| 6,397,267 | B1 * | 5/2002 | Chong, Jr. | 710/1 |
| 6,601,187 | B1 * | 7/2003 | Sicola et al. | 714/6.21 |
| 7,290,168 | B1 * | 10/2007 | DeKoning | 714/5.11 |
| 7,302,539 | B2 * | 11/2007 | Korgaonkar et al. | 711/162 |
| 2002/0087751 | A1 * | 7/2002 | Chong, Jr. | 710/33 |
| 2003/0014682 | A1 * | 1/2003 | Schmidt | 713/500 |
| 2004/0103244 | A1 * | 5/2004 | Fujimoto et al. | 711/113 |
| 2005/0182864 | A1 * | 8/2005 | Hosoya et al. | 710/22 |
| 2006/0190772 | A1 * | 8/2006 | Hanaoka et al. | 714/38 |
| 2008/0147932 | A1 * | 6/2008 | Fukazawa et al. | 710/74 |
| 2009/0037647 | A1 * | 2/2009 | Sugiyama et al. | 711/103 |
| 2009/0070761 | A1 * | 3/2009 | Zhao | 718/1 |
| 2009/0158124 | A1 * | 6/2009 | Kawai et al. | 714/763 |
| 2009/0204743 | A1 * | 8/2009 | Inoue et al. | 711/100 |
| 2010/0097941 | A1 * | 4/2010 | Carlson et al. | 370/245 |

* cited by examiner

*Primary Examiner* — Bryce Bonzo
*Assistant Examiner* — Jeison C Arcos
(74) *Attorney, Agent, or Firm* — Wilmer Cutler Pickering Hale and Dorr LLP

(57) ABSTRACT

A method and system for load balancing. The method includes determining that connectivity between a first host and a primary array controller of a storage system has failed. The first host is configured to send input/output messages (I/Os) to a storage system through a storage network fabric. An available host is discovered at a multi-pathing driver of the first host. The available host is capable of delivering I/Os to the primary array controller. An I/O is redirected from said first host to the available host over a secondary communication network for delivery to the storage system.

20 Claims, 8 Drawing Sheets

METHOD AND SYSTEM FOR CLUSTER WIDE ADAPTIVE I/O SCHEDULING BY A MULTIPATHING DRIVER

BACKGROUND

Near continuous access to data files on enterprise storage arrays is desired, especially during periods when connectivity to the storage array is compromised. For instance, a failover protocol for accessing a storage array is implemented to remedy failed connectivity of active paths to the storage array. However, implementation of the failover protocol is costly in that the user is denied access to the storage array. Moreover, the failover protocol may be triggered throughout a cluster of nodes for failure conditions that are isolated to a single node. As an example, in a N node cluster (e.g., N=64) with an active/passive array configuration, a momentary failover of one or more active paths on any single node accessing the storage array will cause every node in the cluster to undergo a costly failover protocol.

Actions preformed during a failover protocol at each node of a cluster include quiescing I/Os. That is, I/Os are temporarily held from delivery over any primary or secondary paths to the storage array until each of the nodes have switched over to an alternative set of active paths. Thereafter, the I/Os at each node are unquiesced and released for delivery to the storage system. As such, there is an unwanted period of time wherein I/O processing is paused during I/O quiescing, and execution of the failover protocol. Additionally, delivering I/Os over the alternative set of active paths may cause noticeable delays in I/O performance which is also unwanted.

As a further example, a user initiated failover condition may be implemented during maintenance periods. For instance, whenever a primary host controller of a local host is taken down for purposes of performing a maintenance operation (e.g., rebooting the operating system or upgrading the operating system) connectivity between the local host and the storage array over the primary active paths will fail. In that case the failover protocol will be initiated to migrate the sending of I/Os to an alternative set of active paths at the local node as well, as at all the other nodes in the cluster. As such, because maintenance is being performed at one node, all the nodes will suffer in that access to the storage array is prevented during execution of the failover protocol. This leads to significant operational expenses during maintenance periods for the customer associated with the cluster of hosts accessing the storage system.

The propagation of the failover protocol throughout a cluster of nodes accessing a storage array is unfortunate in instances when a failed condition is isolated to a single node in the cluster.

SUMMARY

Systems and methods of load balancing I/Os originating at a host. In one embodiment, a computer implemented method for load balancing is disclosed and includes determining that connectivity between a first host and a primary array controller of a storage system has failed. The operations performed in the method are executed in an effort to avoid implementing a failover protocol. In particular, the first host is configured to send input/output messages (I/Os) to a storage system through a storage network fabric. An available host is discovered at a multi-pathing driver of the first host. The available host is capable of delivering I/Os to the primary array controller. An I/O is shipped or redirected from the first host to the available host over a secondary communication network for delivery to the storage system.

In some embodiments, a system includes a tangible, non-transitory computer-readable storage medium having stored thereon, computer-executable instructions that, when executed causes the computer system to perform a method for load balancing. The method includes determining that connectivity between a first host and a primary array controller of a storage system has failed. The failure may occur at any point in one or more paths between the first host and the primary controller. The operations performed in the method are executed to avoid implementing a failover protocol given the current failure conditions. In particular, the first host is configured to send I/Os to a storage system through a storage network fabric, wherein the network fabric provides access for the hosts to the storage system. The multi-pathing driver of the first host performs a multi-pathing discovery process to discover one or more hosts configured to send I/Os to the storage system. An available host is discovered that is capable of delivering I/Os to the primary array controller. An I/O is redirected from the first host to the available host over a secondary communication network for delivery to the storage system.

In one embodiment, a computer system comprises a processor coupled to memory having stored therein instructions that, if executed by the computer system, cause the computer to execute a method for load balancing. The method includes determining that connectivity between a first host and a storage system has failed, such as, connectivity has failed between a primary host controller of the first host and a target or array controller of the storage system. The operations performed in the method are executed to avoid implementing a failover protocol given the current failure conditions. The first host originates I/Os that are delivered to a storage system through a storage network fabric, wherein the network fabric provides access for the hosts to the storage system. The multi-pathing driver of the first host performs a multi-pathing discovery process to determine one or more hosts configured to send I/Os to the storage system. An available host is discovered that is capable of delivering I/Os to the primary array controller. An I/O is redirected from the first host to the available host over a secondary communication network for delivery to the storage system.

Thus, according to embodiments of the present disclosure, a costly failover operation is avoided by redirecting I/Os from a first host, that has lost connectivity with a primary array controller of a storage system, to a remote available host that is configurable to deliver the redirected I/O.

These and other objects and advantages of the various embodiments of the present disclosure will be recognized by those of ordinary skill in the art after reading the following detailed description of the embodiments that are illustrated in the various drawing figures.

BRIEF DESCRIPTION OF THE DRAWINGS

The accompanying drawings, which are incorporated in and form a part of this specification and in which like numerals depict like elements, illustrate embodiments of the present disclosure and, together with the description, serve to explain the principles of the disclosure.

DETAILED DESCRIPTION

Figure 1:
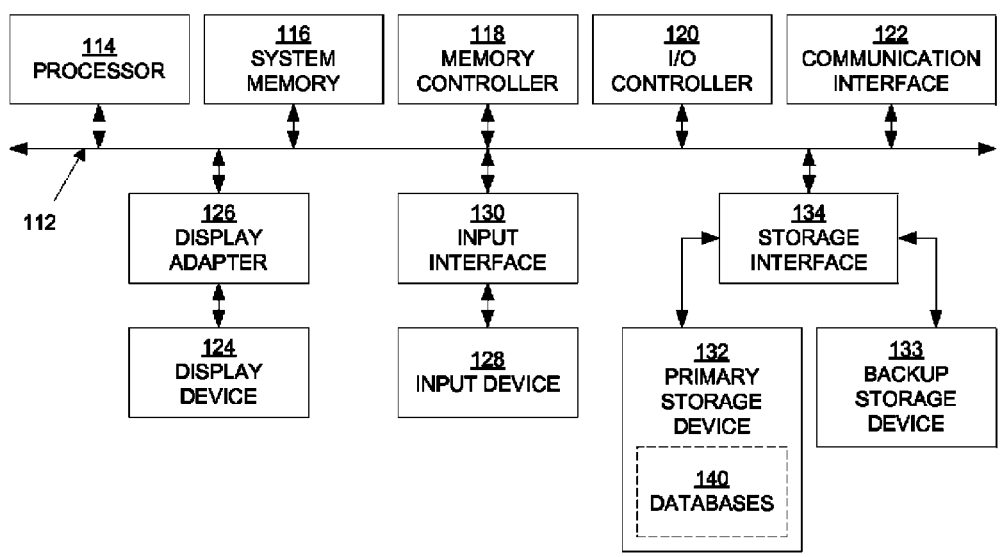
FIG. 1 depicts a block diagram of an exemplary computer system suitable for implementing the present methods in accordance with one embodiment of the present disclosure.

Reference will now be made in detail to the various embodiments of the present disclosure, examples of which are illustrated in the accompanying drawings. While described in conjunction with these embodiments, it will be understood that they are not intended to limit the disclosure to these embodiments. On the contrary, the disclosure is intended to cover alternatives, modifications and equivalents, which may be included within the spirit and scope of the disclosure as defined by the appended claims. Furthermore, in the following detailed description of the present disclosure, numerous specific details are set forth in order to provide a thorough understanding of the present disclosure. However, it will be understood that the present disclosure may be practiced without these specific details. In other instances, well-known methods, procedures, components, and circuits have not been described in detail so as not to unnecessarily obscure aspects of the present disclosure.

Some portions of the detailed descriptions that follow are presented in terms of procedures, logic blocks, processing, and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be a self-consistent sequence of steps or instructions leading to a desired result. The steps are those utilizing physical manipulations of physical quantities. Usually, although not necessarily, these quantities take the form of electrical or magnetic signals capable of being stored, transferred, combined, compared, and otherwise manipulated in a computer system. It has proven convenient at times, principally for reasons of common usage, to refer to these signals as transactions, bits, values, elements, symbols, characters, samples, pixels, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present disclosure, discussions utilizing terms such as "determining," "discovering," "sending," "redirecting," "disabling," "selecting," or the like, refer to actions and processes (e.g., flowchart 500 of FIG. 5 and flow chart 800 of FIG. 8) of a computer system or similar electronic computing device or processor (e.g., system 110 of FIG. 1). The computer system or similar electronic computing device manipulates and transforms data represented as physical (electronic) quantities within the computer system memories, registers or other such information storage, transmission or display devices.

Embodiments described herein may be discussed in the general context of computer-executable instructions residing on some form of computer-readable storage medium, such as program modules, executed by one or more computers or other devices. By way of example, and not limitation, computer-readable storage media may comprise non-transitory computer storage media and communication media. Generally, program modules include routines, programs, objects, components, data structures, etc., that perform particular tasks or implement particular abstract data types. The functionality of the program modules may be combined or distributed as desired in various embodiments.

Computer storage media includes volatile and nonvolatile, removable and non-removable media implemented in any method or technology for storage of information such as computer-readable instructions, data structures, program modules or other data. Computer storage media includes, but is not limited to, random access memory (RAM), read only memory (ROM), electrically erasable programmable ROM (EEPROM), flash memory or other memory technology, compact disk ROM (CD-ROM), digital versatile disks (DVDs) or other optical storage, magnetic cassettes, magnetic tape, magnetic disk storage or other magnetic storage devices, or any other medium that can be used to store the desired information and that can accessed to retrieve that information.

Communication media can embody computer-executable instructions, data structures, and program modules, and includes any information delivery media. By way of example, and not limitation, communication media includes wired media such as a wired network or direct-wired connection, and wireless media such as acoustic, radio frequency (RF), infrared and other wireless media. Combinations of any of the above can also be included within the scope of computer-readable media.

FIG. 1 is a block diagram of an example of a computing system 110 capable of implementing embodiments of the present disclosure. Computing system 110 broadly represents any single or multi-processor computing device or system capable of executing computer-readable instructions. Examples of computing system 110 include, without limitation, workstations, laptops, client-side terminals, servers, distributed computing systems, handheld devices, or any other computing system or device. In its most basic configuration, computing system 110 may include at least one processor 114 and a system memory 116.

Processor 114 generally represents any type or form of processing unit capable of processing data or interpreting and executing instructions. In certain embodiments, processor 114 may receive instructions from a software application or module. These instructions may cause processor 114 to perform the functions of one or more of the example embodiments described and/or illustrated herein. For example, processor 114 may perform and/or be a means for performing, either alone or in combination with other elements, one or more of the identifying, determining, using, implementing, translating, tracking, receiving, moving, and providing described herein. Processor 114 may also perform and/or be a means for performing any other steps, methods, or processes described and/or illustrated herein.

System memory 116 generally represents any type or form of volatile or non-volatile storage device or medium capable of storing data and/or other computer-readable instructions. Examples of system memory 116 include, without limitation, RAM, ROM, flash memory, or any other suitable memory device. Although not required, in certain embodiments computing system 110 may include both a volatile memory unit (such as, for example, system memory 116) and a non-volatile storage device (such as, for example, primary storage device 132).

Computing system 110 may also include one or more components or elements in addition to processor 114 and system memory 116. For example, in the embodiment of FIG. 1, computing system 110 includes a memory controller 118, an input/output (I/O) controller 120, and a communication interface 122, each of which may be interconnected via a communication infrastructure 112. Communication infrastructure 112 generally represents any type or form of infrastructure capable of facilitating communication between one or more components of a computing device. Examples of communication infrastructure 112 include, without limitation, a communication bus (such as an Industry Standard Architecture (ISA), Peripheral Component Interconnect (PCI), PCI Express (PCIe), or similar bus) and a network.

Memory controller 118 generally represents any type or form of device capable of handling memory or data or controlling communication between one or more components of computing system 110. For example, memory controller 118 may control communication between processor 114, system memory 116, and I/O controller 120 via communication infrastructure 112. Memory controller may perform and/or be a means for performing, either alone or in combination with other elements, one or more of the operations or features described herein.

I/O controller 120 generally represents any type or form of module capable of coordinating and/or controlling the input and output functions of a computing device. For example, I/O controller 120 may control or facilitate transfer of data between one or more elements of computing system 110, such as processor 114, system memory 116, communication interface 122, display adapter 126, input interface 130, and storage interface 134. I/O controller 120 may be used, for example, to perform and/or be a means for performing, either alone or in combination with other elements, one or more of the operations described herein. I/O controller 120 may also be used to perform and/or be a means for performing other operations and features set forth in the instant disclosure.

Communication interface 122 broadly represents any type or form of communication device or adapter capable of facilitating communication between example computing system 110 and one or more additional devices. For example, communication interface 122 may facilitate communication between computing system 110 and a private or public network including additional computing systems. Examples of communication interface 122 include, without limitation, a wired network interface (such as a network interface card), a wireless network interface (such as a wireless network interface card), a modem, and any other suitable interface. In one embodiment, communication interface 122 provides a direct connection to a remote server via a direct link to a network, such as the Internet. Communication interface 122 may also indirectly provide such a connection through, for example, a local area network (such as an Ethernet network), a personal area network, a telephone or cable network, a cellular telephone connection, a satellite data connection, or any other suitable connection.

Communication interface 122 may also represent a host adapter configured to facilitate communication between computing system 110 and one or more additional network or storage devices via an external bus or communications channel. Examples of host adapters include, without limitation, Small Computer System Interface (SCSI) host adapters, Universal Serial Bus (USB) host adapters, IEEE (Institute of Electrical and Electronics Engineers) 1394 host adapters, Serial Advanced Technology Attachment (SATA) and External SATA (eSATA) host adapters, Advanced Technology Attachment (ATA) and Parallel ATA (PATA) host adapters, Fibre Channel interface adapters, Ethernet adapters, or the like. Communication interface 122 may also allow computing system 110 to engage in distributed or remote computing. For example, communication interface 122 may receive instructions from a remote device or send instructions to a remote device for execution. Communication interface 122 may perform and/or be a means for performing, either alone or in combination with other elements, one or more of the operations disclosed herein. Communication interface 122 may also be used to perform and/or be a means for performing other operations and features set forth in the instant disclosure.

As illustrated in FIG. 1, computing system 110 may also include at least one display device 124 coupled to communication infrastructure 112 via a display adapter 126. Display device 124 generally represents any type or form of device capable of visually displaying information forwarded by display adapter 126. Similarly, display adapter 126 generally represents any type or form of device configured to forward graphics, text, and other data from communication infrastructure 112 (or from a frame buffer, as known in the art) for display on display device 124.

As illustrated in FIG. 1, computing system 110 may also include at least one input device 128 coupled to communication infrastructure 112 via an input interface 130. Input device 128 generally represents any type or form of input device capable of providing input, either computer- or human-generated, to computing system 110. Examples of input device 128 include, without limitation, a keyboard, a pointing device, a speech recognition device, or any other input device. In one embodiment, input device 128 may perform and/or be a means for performing, either alone or in combination with other elements, one or more of the operations disclosed herein. Input device 128 may also be used to perform and/or be a means for performing other operations and features set forth in the instant disclosure.

As illustrated in FIG. 1, computing system 110 may also include a primary storage device 132 and a backup storage device 133 coupled to communication infrastructure 112 via a storage interface 134. Storage devices 132 and 133 generally represent any type or form of storage device or medium capable of storing data and/or other computer-readable instructions. For example, storage devices 132 and 133 may be a magnetic disk drive (e.g., a so-called hard drive), a floppy disk drive, a magnetic tape drive, an optical disk drive, a flash drive, or the like. Storage interface 134 generally represents any type or form of interface or device for transferring data between storage devices 132 and 133 and other components of computing system 110.

In one example, databases 140 may be stored in primary storage device 132. Databases 140 may represent portions of a single database or computing device or a plurality of databases or computing devices. For example, databases 140 may represent (be stored on) a portion of computing system 110 and/or portions of example network architecture 200 in FIG. 2 (below). Alternatively, databases 140 may represent (be stored on) one or more physically separate devices capable of being accessed by a computing device, such as computing system 110 and/or portions of network architecture 200.

Continuing with reference to FIG. 1, storage devices 132 and 133 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 132 and 133 may also include other similar structures or devices for allowing computer software, data, or other computer-readable instructions to be loaded into computing system 110. For example, storage devices 132 and 133 may be configured to read and write software, data, or other computer-readable information. Storage devices 132 and 133 may also be a part of computing system 110 or may be separate devices accessed through other interface systems.

Storage devices 132 and 133 may be used to perform, and/or be a means for performing, either alone or in combination with other elements, one or more of the operations disclosed herein. Storage devices 132 and 133 may also be used to perform, and/or be a means for performing, other operations and features set forth in the instant disclosure.

Many other devices or subsystems may be connected to computing system 110. Conversely, all of the components and devices illustrated in FIG. 1 need not be present to practice the embodiments described herein. The devices and subsystems referenced above may also be interconnected in different ways from that shown in FIG. 1. Computing system 110 may also employ any number of software, firmware, and/or hardware configurations. For example, the example embodiments disclosed herein may be encoded as a computer program (also referred to as computer software, software applications, computer-readable instructions, or computer control logic) on a computer-readable medium.

The computer-readable medium containing the computer program may be loaded into computing system 110. All or a portion of the computer program stored on the computer-readable medium may then be stored in system memory 116 and/or various portions of storage devices 132 and 133. When executed by processor 114, a computer program loaded into computing system 110 may cause processor 114 to perform and/or be a means for performing the functions of the example embodiments described and/or illustrated herein. Additionally or alternatively, the example embodiments described and/or illustrated herein may be implemented in firmware and/or hardware. For example, computing system 110 may be configured as an application specific integrated circuit (ASIC) adapted to implement one or more of the embodiments disclosed herein.

Figure 2:
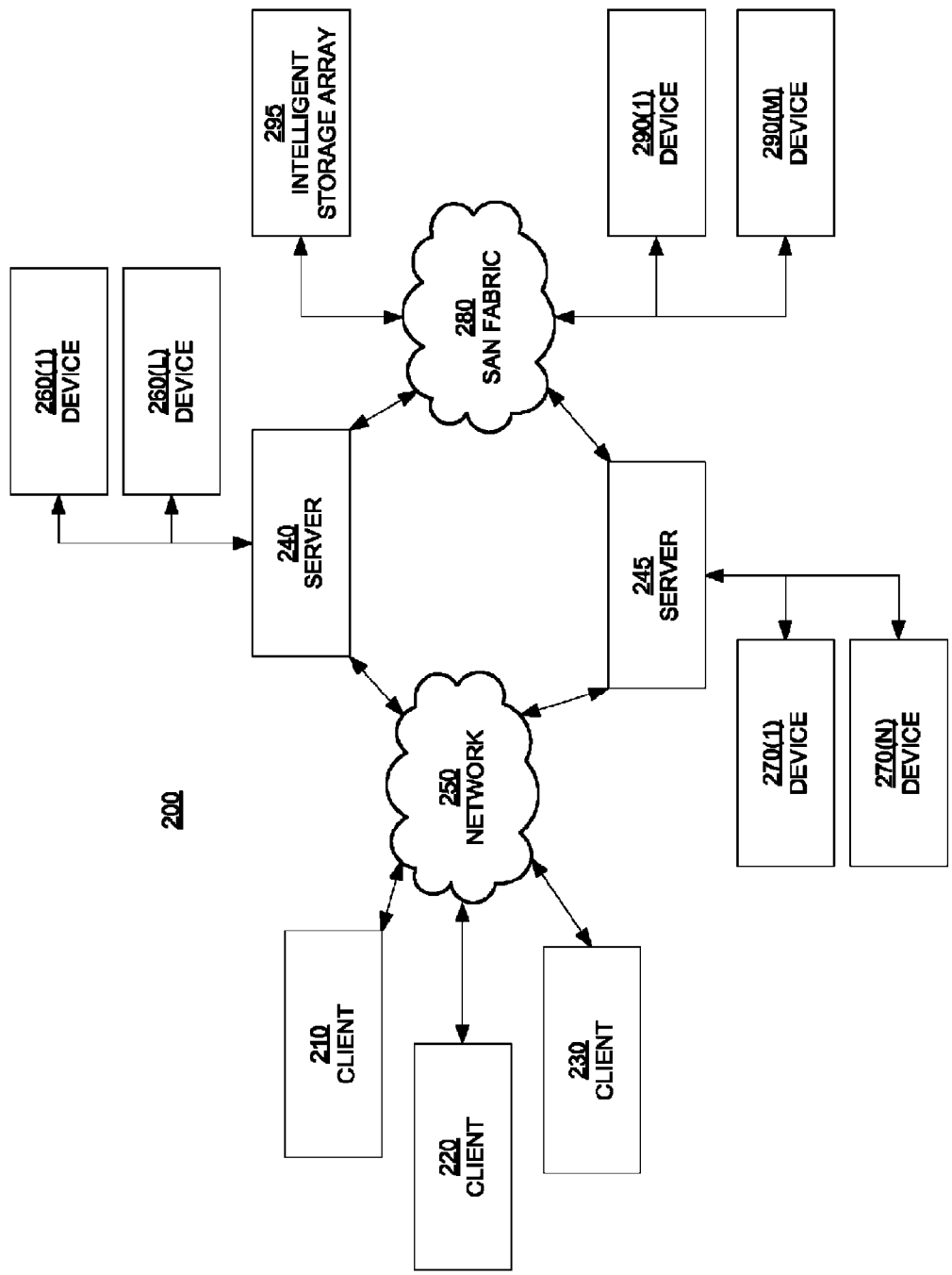
FIG. 2 is a block diagram depicting a network architecture in accordance with one embodiment of the present disclosure.

FIG. 2 is a block diagram of an example of a network architecture 200 in which client systems 210, 220, and 230 and servers 240 and 245 may be coupled to a network 250. Client systems 210, 220, and 230 generally represent any type or form of computing device or system, such as computing system 110 of FIG. 1.

Similarly, servers 240 and 245 generally represent computing devices or systems, such as application servers or database servers, configured to provide various database services and/or run certain software applications. Network 250 generally represents any telecommunication or computer network including, for example, an intranet, a wide area network (WAN), a local area network (LAN), a personal area network (PAN), or the Internet.

As illustrated in FIG. 2, one or more storage devices 260(1)-(L) may be directly attached to server 240. Similarly, one or more storage devices 270(1)-(N) may be directly attached to server 245. Storage devices 260(1)-(L) and storage devices 270(1)-(N) generally represent any type or form of storage device or medium capable of storing data and/or other computer-readable instructions. Storage devices 260(1)-(L) and storage devices 270(1)-(N) may represent network-attached storage (NAS) devices configured to communicate with servers 240 and 245 using various protocols, such as Network File System (NFS), Server Message Block (SMB), or Common Internet File System (CIFS).

Servers 240 and 245 may also be connected to a storage area network (SAN) fabric 280. SAN fabric 280 generally represents any type or form of computer network or architecture capable of facilitating communication between storage devices. SAN fabric 280 may facilitate communication between servers 240 and 245 and storage devices 290(1)-(M) and/or an intelligent storage array 295. SAN fabric 280 may also facilitate, via network 250 and servers 240 and 245, communication between client systems 210, 220, and 230 and storage devices 290(1)-(M) and/or intelligent storage array 295 in such a manner that devices 290(1)-(M) and array 295 appear as locally attached devices to client systems 210, 220, and 230. As with storage devices 260(1)-(L) and storage devices 270(1)-(N), storage devices 290(1)-(M) and intelligent storage array 295 generally represent any type or form of storage device or medium capable of storing data and/or other computer-readable instructions.

With reference to computing system 110 of FIG. 1, a communication interface, such as communication interface 122, may be used to provide connectivity between each client system 210, 220, and 230 and network 250. Client systems 210, 220, and 230 may be able to access information on server 240 or 245 using, for example, a Web browser or other client software. Such software may allow client systems 210, 220, and 230 to access data hosted by server 240, server 245, storage devices 260(1)-(L), storage devices 270(1)-(N), storage devices 290(1)-(M), or intelligent storage array 295. Although FIG. 2 depicts the use of a network (such as the Internet) for exchanging data, the embodiments described herein are not limited to the Internet or any particular network-based environment.

Returning to FIG. 2, in one embodiment, all or a portion of one or more of the example embodiments disclosed herein are encoded as a computer program and loaded onto and executed by server 240, server 245, storage devices 260(1)-(L), storage devices 270(1)-(N), storage devices 290(1)-(M), intelligent storage array 295, or any combination thereof. All or a portion of one or more of the example embodiments disclosed herein may also be encoded as a computer program, stored in server 240, run by server 245, and distributed to client systems 210, 220, and 230 over network 250. Accordingly, network architecture 200 may perform and/or be a means for performing, either alone or in combination with other elements, one or more of the operations disclosed herein. Network architecture 200 may also be used to perform and/or be a means for performing other operations and features set forth in the instant disclosure.

Accordingly, embodiments of the present disclosure illustrate the implementation of a load balancing solution in which rather than implementing a cluster-wide failover protocol when a single local node loses connectivity over a primary path to a storage system, I/Os from the local node are redirected to another available, remote host that is capable of sending I/Os to the storage system. In still other embodiments, a failover protocol is avoided by redirecting I/Os to a remote and available host, whenever a failover condition is flagged during performance of maintenance operations on a local node, wherein the maintenance operations will cause the loss of connectivity over a primary path to a storage system.

Embodiments of the present disclosure are described within the context of a data or file storage system. As previously described, the storage system provides for storing and organizing computer information, files and their data, for example within the storage devices of FIG. 2. At a high level, the storage system organizes files into a database for storage, organization, manipulation and retrieval by one or more requesting host computing systems. In some embodiments, the file storage system supports a single user associated with a single computing system. In other embodiments, the file storage system supports a large enterprise including individuals (e.g., company, corporation, etc.). More particularly, the performance of multi-pathing operations by a multi-pathing driver of a local host is performed in relation to a logical unit number (LUN) of a storage system. The LUN may define a logical partitioning of a physical file system, in which LUNs are then grouped to form logical volumes upon which virtual disks are formed. In some systems, LUNs provide the necessary addressing for performing I/O operations, such as, reads, writes, etc.

Figure 3:
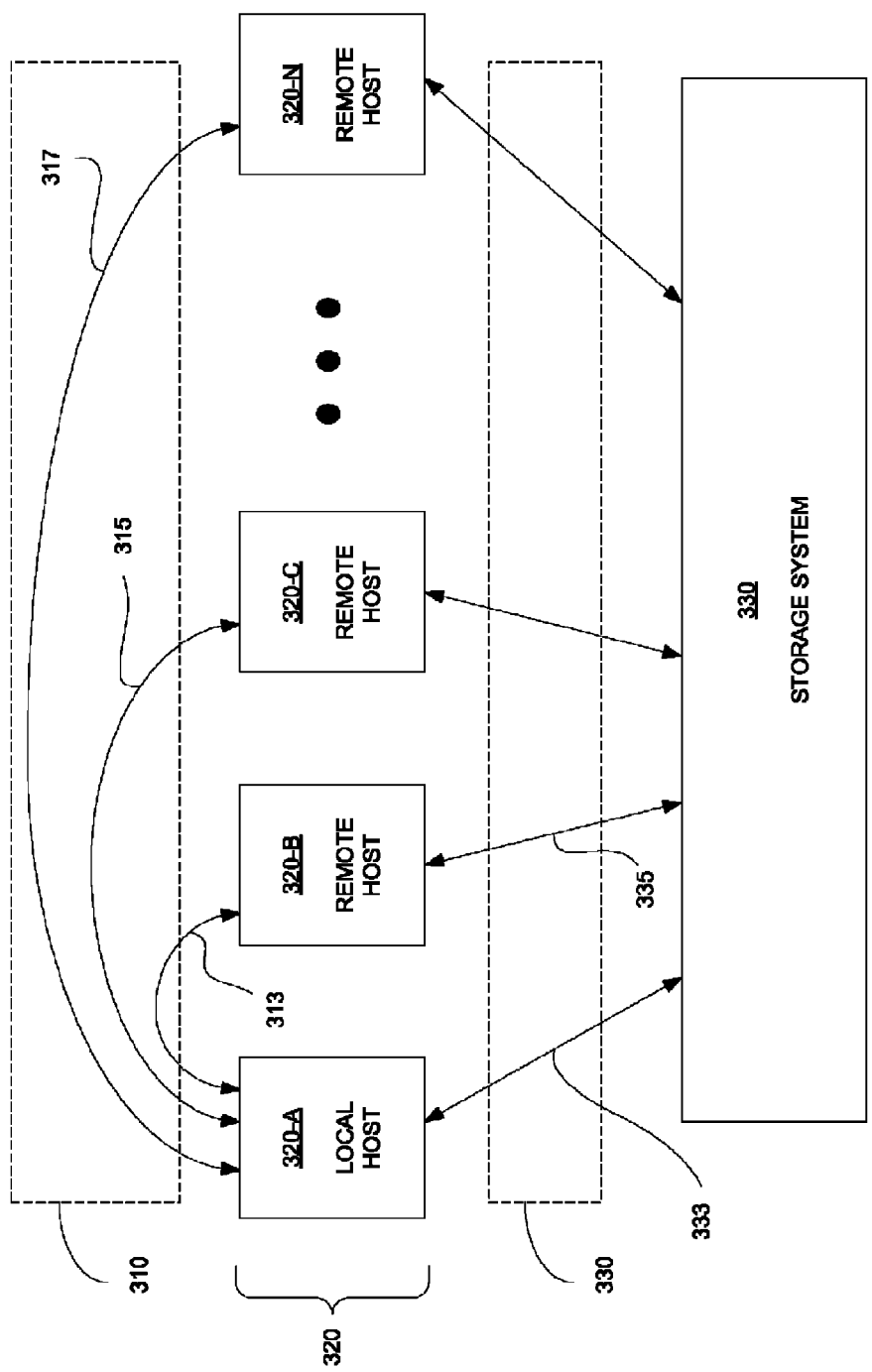
FIG. 3 is a data flow diagram depicting a the flow of input/output messages (I/Os) between a plurality of hosts and a storage system, in which an I/O is redirected from a local host to a remote host to avoid a failover protocol, in accordance with one embodiment of the present disclosure.

FIG. 3 is a data flow diagram 300 depicting a the flow of input/output messages (I/Os) between a plurality of hosts and a storage system, in accordance with one embodiment of the present disclosure. In particular, the data flow diagram 300 illustrates the avoidance of the implementation of a cluster-wide failover protocol, when a failure condition is isolated to a local host 320A.

As shown in FIG. 3, a storage system 330 is shown providing a dedicated network for accessing consolidated, block level data storage. For instance, in general, storage system 330 may be a storage area network (SAN) or other enterprise level storage system. The storage system presents one or more physical and/or logical disk arrays accessible to host servers so that the disk arrays appear like locally attached devices. For instance, disk arrays may be configured as small computer system interface (SCSI) devices that are visible as one or more LUNs, wherein the SAN consolidates the devices together through a high speed network.

As shown a plurality of hosts 320 are configured for accessing the storage system 330. That is, each of the hosts is configurable to access the storage system 330. The plurality of hosts is configured as a local host and one or more remote hosts, wherein each host is capable of being referenced as a local host 320A that is also associated with one or more remote hosts 320B-N. For purposes of illustration, local host 320A is configured to access storage system 330 over one or more primary paths 333. In addition, remote host 320B is configured to access storage system 330 over one or more primary paths 335. Other remote hosts (320C-N) are also configured to access storage system 330 over one or more primary paths.

More particularly, the hosts access the storage system through a high performance (e.g., bandwidth and throughput) storage network fabric 330. For instance, the storage system 330 may be accessible through a switched fabric topology (e.g., Fibre Channel switched fabric topology), wherein devices are communicatively coupled together through one or more Fibre Channel switches. The switches (not shown) form a mesh network, wherein the plurality of hosts 320 form the edges of the mesh network. The storage network fabric 330 is configurable for redundant operation, such that the storage system 330 is accessible even though connectivity through a primary path between a host and the storage system 300 has failed.

In embodiments of the present disclosure, local host 320A is also communicatively coupled over a secondary communication network 310 to other nodes or hosts in the cluster forming the plurality of hosts 320. For instance, local host 320A is coupled to remote host 320B over connection 313, coupled to remote host 320C over connection 315, and coupled to remote host 320N over connection 317. In one embodiment, the secondary communication network 310 is an Ethernet/IP network.

Figure 4:
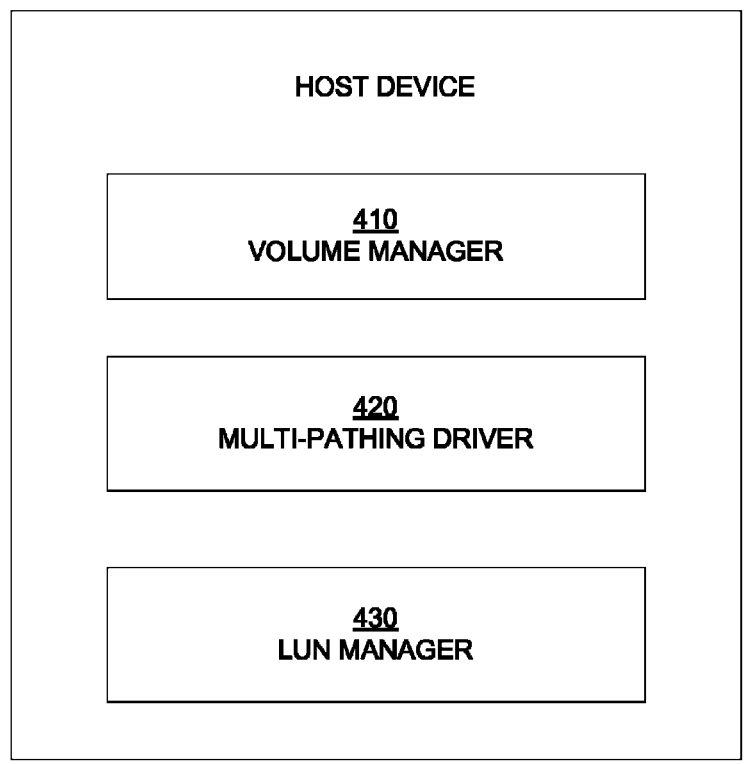
FIG. 4 is a block diagram illustrating a system capable redirecting I/Os from a local host to a remote host to avoid a failover protocol, in accordance with one embodiment of the present disclosure.

FIG. 4 is a block diagram illustrating a host device 400 that is capable shipping or redirecting I/Os from a local host to a remote host to avoid a failover protocol, in accordance with one embodiment of the present disclosure. In particular, the local host device is comprised of a volume manager 410, a multi-pathing driver 420, and a LUN 430 that operate at different levels of awareness of remote hosts and local and remote paths to the underlying storage system (not shown).

In particular, LUN 430 is configured to manage the file systems within the storage system that the host is accessing. For instance, LUN 430 is able to recognize and/or manage the file systems within a particular LUN of the storage system that the host is accessing.

In addition, the multi-pathing driver 420 is configured to discover and manage the local paths that provide redundant connections to the underlying storage system. For instance, the multi-pathing driver 420 is able to determine the active and passive paths that provide primary and secondary access to the storage array from the host. For instance, an active path provides primary access to the storage system through a primary host controller and a primary array controller. Also, a passive path provides secondary access to the storage system through a secondary host controller and a secondary array controller. In embodiments of the present disclosure, the multi-pathing driver is capable of discovering remote paths to the storage system providing access to a particular LUN through one or more local and remote paths, as will be described below.

Further, the volume manager 410 is more cluster aware than the multi-pathing driver 420. In particular, volume manager 410 provides a host based driver that is configured to discover the layout of storage access throughout a plurality of hosts. That is, the volume manager is able to discover which hosts (e.g., local and remote) are able to access a particular LUN either through a primary array controller or through a secondary array controller. That information is provided to the multi-pathing driver 420 for purposes of shipping or redirecting I/Os from a local host to an available remote host, especially when avoiding implementation of a failover protocol, in embodiments of the present disclosure. In other embodiments, the discovery of remote hosts capable of delivering I/Os to the storage system is performed at the multi-pathing level of the local host.

Figure 5:
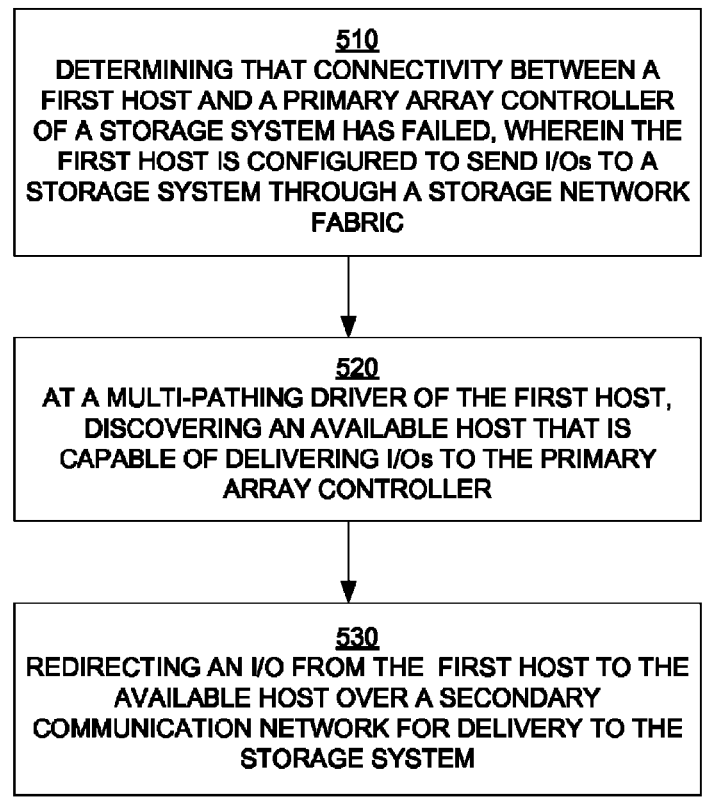
FIG. 5 is a flow diagram depicting a method for load balancing, in which an I/O is redirected from a local host to a remote host to avoid a failover protocol, in accordance with one embodiment of the present disclosure.

FIG. 5 is a flow diagram 500 depicting a computer implemented method for load balancing, in which an I/O is shipped or redirected from a local host to a remote host to avoid a failover protocol, in accordance with one embodiment of the present disclosure. In another embodiment, flow diagram 500 is implemented within a computer system including a processor and memory coupled to the processor and having stored therein instructions that, if executed by the computer system causes the system to execute the method for load balancing. In still another embodiment, instructions for performing the method are stored on a non-transitory computer-readable storage medium having computer-executable instructions for causing a computer system to perform a method for load balancing as outlined by flow diagram 500. The method outlined in flow diagram 500 is implementable by the multi-pathing driver 420 of the host device of FIG. 4, and as such is implemented at the LUN level of storage management, in one embodiment.

At 510, connectivity between a first host, or local host, and a primary array controller of a storage system is determined to be lost. The local host is configured to deliver and/or send I/Os to a storage system through a storage network fabric (e.g., Fibre Channel fabric switch network). For example, the local host is configured to deliver an I/O to a particular LUN of the storage system through the storage network fabric. More particularly, the connectivity has failed so that I/Os originating from the local host are undeliverable over the primary communication paths between the local host and the storage system. That is, connectivity has failed over at least one primary path between a host controller at the local host and the primary array controller of the storage system. Also, connectivity may fail over at least one secondary path between a host controller and the secondary array controller. Normally, a connectivity failure will trigger a cluster wide failover protocol, however, embodiments of the present disclosure are able to avoid the failover protocol, such as, when there is a connectivity failover that is isolated to a local host.

At 520, at a multi-pathing driver of the local host, an available host is discovered that is capable of delivering I/Os to the primary array controller, for purposes of avoiding a failover protocol. In particular, although the multi-pathing driver is aware of the various local paths available for delivering I/Os from the local host to the storage system, the multi-pathing driver is also made aware of or discovers or determines one or more available remote paths through which an I/O originating at the local host may be delivered to the storage system. For instance, a list of potential hosts can be configured and then the multi-pathing driver uses a distributed protocol to determine connectivity. As such, the multi-pathing driver may be made aware of or discovers at least one remote host configured for delivering I/Os to a LUN through the primary array controller, wherein the LUN is also accessed by the local host. Shipping I/Os is performed for purposes of avoiding path failover where there is an active path failure, to provide redundancy when there is an all path failure, and to provide load balancing when there is no path failure.

In one embodiment, the available hosts are discovered at the multi-pathing layer. That is, a multi-pathing discovery process is performed to discover a plurality of local and remote communication paths to the storage system, wherein the paths are configured for accessing the storage system through a storage network fabric. For instance, a cluster-wide connectivity check is performed to obtain up-to-date connectivity state for all cluster hosts. More particularly, the local host is configured to deliver I/Os to the storage system via one or more local paths that are discoverable, and one or more available hosts are configured to send I/Os, including redirected I/Os, to the storage system via one or more remote paths that are discoverable.

In one embodiment, the multi-pathing driver discovers the available, remote hosts through an identification number. That is, hosts (e.g., local and remote) accessing the same LUN, will identity the LUN using the same identification number. As such, the hosts are discoverable. In one embodiment, the multi-pathing driver is configured to discover which remote hosts are also accessing the same LUN. In another embodiment, the volume manager residing on the host is configured to discover which remote hosts are accessing the same LUN.

At 530, an I/O from the local host is shipped or redirected to the available, remote host for purposes of delivering the I/O to the storage system over the storage network fabric. The I/O is redirected to the available, remote host through a secondary communication network (e.g., Ethernet/IP network). The secondary communication network is used primarily for host to host communication, and is used in embodiments of the present disclosure for redirecting I/O between hosts.

Redirecting the I/O to the available host is performed in order to avoid a failover operation that is triggered by a connectivity failure between a local host and the storage system. The connectivity failover may be isolated to the local host in that a primary path between the local host and the primary array controller has been lost. Though avoided by embodiments of the disclosure, a local failover protocol will switch access of the storage network through one or more secondary paths accessing the storage network through a secondary array controller when connectivity is lost over the primary path. In that case, a cluster-wide failover operation is typically performed to align all hosts accessing a particular LUN with the secondary array controller for efficiency purposes. However, embodiments of the present disclosure are able to avoid performing the failover protocol by redirecting the I/O to an available, remote host. In that case, the failover protocol or operation is disabled or deferred. Additionally, if the failure condition persists for a sustained basis, it may be preferable to implement a path failover rather than continuing to redirect I/Os. The amount of I/Os being shipped, number of nodes in a cluster, I/O shipping overhead, number of hosts with connectivity to the primary and secondary controller, as well as other considerations are considered when determining whether to continue to redirect I/Os.

Thereafter, the I/O is delivered to the storage system from the available, remote host on behalf of the local host. In addition, any messages sent in response to the redirected I/O is delivered back through the available, remote host and to the originating, local host. That is, the response message is received by the local host over the secondary communication network from the storage system and via the available, remote host.

In some embodiments, more than one available host that is remote is discovered. The available hosts are each capable of delivering I/Os to a particular LUN of a storage system through a primary array controller. In that manner, I/Os originating from the local host and targeted to the LUN through the primary array controller may be redirected to an available host. When more than one available host is discovered, one available host is selected. More particularly, global I/O characteristics for each of the plurality of hosts are determined in reference to the first host. The available host is selected based on favorable I/O characteristics, in one embodiment. For instance, I/O characteristics for each available host includes determining local I/O throughput, network latency, and a combination of both between the local host and the corresponding available host. Local throughput is based on I/O performance through the local host, whereas I/O characteristics of a remote node may include I/O throughput and network latency in reference to the local node.

I/O characteristics are collected on a periodic basis, in embodiments. For example, throughput characteristics are collected on a shorter period (e.g., once every 5 minutes), and network latency is collected over a longer period (e.g., once every 24 hours). In that manner, global statistics are determined that portrays how quickly I/Os are delivered through the corresponding remote host, and how long it takes for a redirected I/O to be sent to the remote host. The available host that has the most favorable I/O characteristics (e.g., local I/O throughput and network latency) is selected. I/O characteristics can be modified dynamically taking into consideration I/O context, as well as based on the response it receives as part of I/O scheduling received from other hosts. Further, default I/O characteristics may be defined to provide initial values for considering section of remote hosts for redirecting I/Os.

In another embodiment, load balancing at the multi-pathing layer is performed. Specifically, a computer implemented method for load balancing is disclosed in which an I/O is shipped or redirected from a local host to a remote host for purposes of load balancing. This load balancing is performed even in situations where connectivity has not been lost to the primary array controller. For instance, load balancing would be implemented to address performance degradation over a local path or network, such that I/Os would be shipped to a remote host having a remote path that has better performance I/O characteristics. Also, this load balancing between local and remote paths would ensure that all available local and remote paths would be utilized to maximize performance.

In particular, a method for performing load balancing is disclosed and includes: at a multi-pathing driver of a first host configured to send I/Os to a storage system via one or more local paths, discovering a plurality of local and remote communication paths to the storage system through a plurality of hosts through a multi-pathing discovery process, wherein the plurality of hosts are configured for accessing the storage system through a storage network fabric; determining an available host in the plurality of hosts through the multi-pathing discovery process, wherein the available host is capable of delivering I/Os to the storage system over at least one remote path through the storage network fabric; and redirecting an I/O from the first host to the available host over a secondary communication network for delivery to the storage system.

More specifically, the discovery process occurs at a multi-pathing level of the local host. In particular, the multi-pathing driver is also made aware of or discovers one or more available remote paths through which an I/O originating at the local host may be delivered to the storage system. For instance, the multi-pathing driver may be made aware of or discovers at least one remote host configured for delivering I/Os to a LUN through the primary array controller, wherein the LUN is also accessed by the local host. Specifically, a multi-pathing discovery process is performed to discover a plurality of local and remote communication paths to the storage system, wherein the paths are configured for accessing the storage system through a storage network fabric. As an example, a cluster-wide connectivity check is performed to obtain up-to-date connectivity state for all cluster hosts. Also, an available host is selected that is capable of delivering I/Os to the primary array controller. An I/O from the local host is shipped or redirected to the available, remote host for purposes of delivering the I/O to the storage system over the storage network fabric. The I/O is redirected to the available, remote host through a secondary communication network (e.g., Ethernet/IP network). The secondary communication network is used primarily for host to host communication, and is used in embodiments of the present disclosure for redirecting I/O between hosts.

Figure 6:
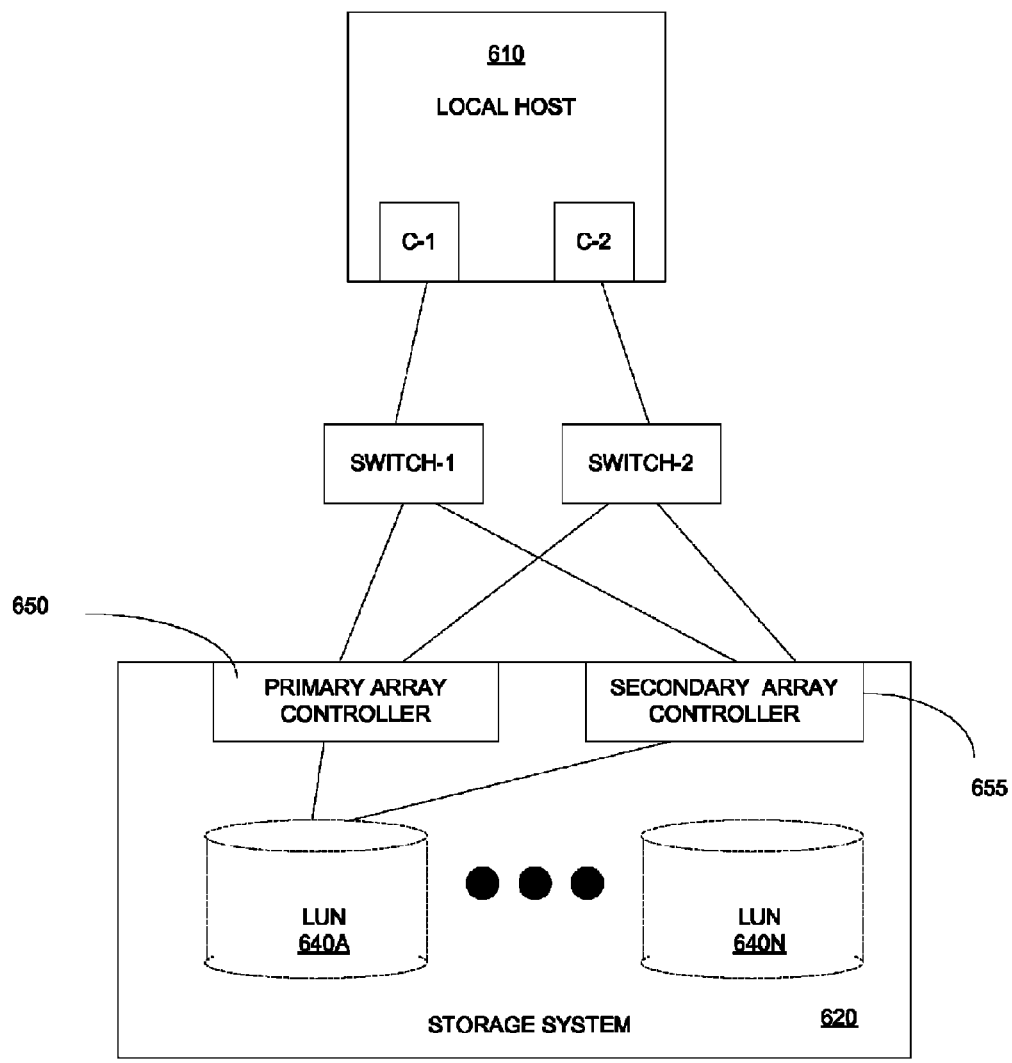
FIG. 6 is a data flow diagram depicting the layout of multiple communication paths between a local host and a storage system, in accordance with one embodiment of the present disclosure.

FIG. 6 is a data flow diagram 600 depicting the layout of multiple communication paths between a local host and a storage system, in accordance with one embodiment of the present disclosure. The operations performed by flow diagram 600 are implemented by host 400 in order to deliver I/Os over one or more local paths to a storage system, in accordance with one embodiment of the present disclosure.

Configuration of a local host 610 for accessing a storage system 620 is shown in diagram 600. Storage system 620 includes a plurality of LUNs 640A-N, and is configured in an active/passive configuration. The configuration shown in FIG. 6 is used to illustrate one of many communication configuration for providing communication between a plurality of hosts and a storage system 620 for accessing LUN 640A. As shown, communication between the local host 610 and the storage system is provided by one or more storage network fabrics, such as, a primary network fabric and a secondary network fabric. More particularly, local host includes two host controllers C-1 and C-2, wherein C-1 is a primary host controller, and C-2 is a secondary host controller. The primary host controller is used to support the primary paths to the storage system 620, wherein the secondary host controller is used to support secondary or backup paths to the storage system 620. For purposes of illustration only, one or more primary or active paths to LUN 640A may be defined as those serviced by host controller C-1, switch-1, and primary array controller 650. Secondary or passive paths to LUN 640A may be defined as those serviced by host controller C-2, switch-2, and secondary array controller 655. As long as the primary paths to LUN 640A are open, no failover condition exists, and the primary paths act to deliver I/Os from the local host 610 to the storage system for accessing LUN 640A. Secondary paths are implemented under a failover protocol, such as, when a primary path fails. However, embodiments of the present disclosure are able to avoid implementation of a failover protocol by redirecting I/Os originating from the host to a remote host, as outlined in FIG. 7.

Figure 7:
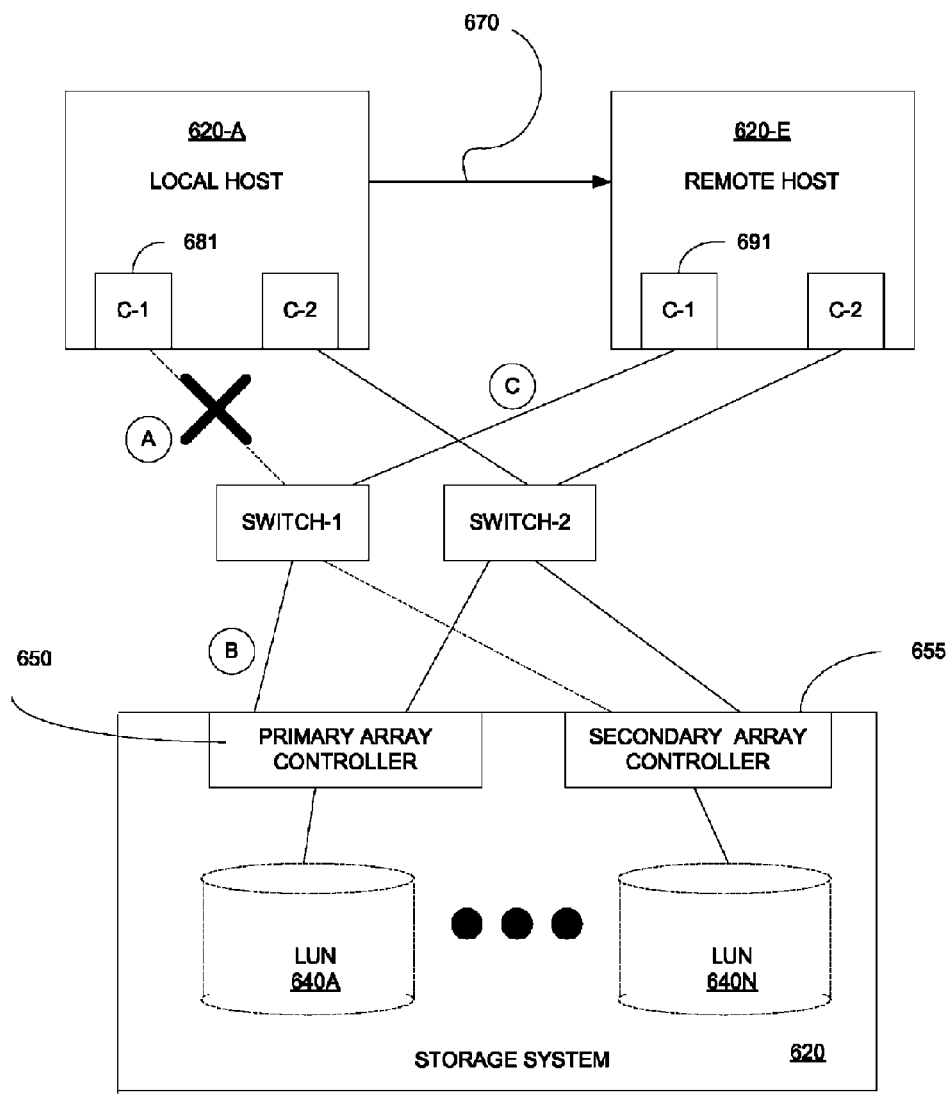
FIG. 7 is a data flow diagram depicting failed connectivity between a local host and a primary array controller of a storage system and the redirecting of I/Os from the local host to a remote host, in accordance with one embodiment of the present disclosure.

FIG. 7 is a data flow diagram 700 depicting failed connectivity between a local host 620A and a primary array controller 650 of a storage system 620 and the redirecting of I/Os from the local host 620A to a remote host 620E in a N host cluster providing access to the storage system 620, in accordance with one embodiment of the present disclosure. FIG. 7 is shown in conjunction with FIG. 6 to illustrate the implementation of the shipping or redirecting of I/Os to a remote host to avoid implementation of a failover protocol. The operations performed by flow diagram 700 are implemented by host 400 in order to deliver I/Os over one or more local paths to a storage system, in accordance with one embodiment of the present disclosure As shown in FIG. 7, storage system 620 is configured as an active/passive array, wherein access to a particular LUN 640A of the storage system 620 is provided through one or more primary paths via a primary array controller 650. In other embodiments, access to more than one LUN of the storage system is provided over the primary paths via the primary array controller. Secondary paths to the storage system, and to the particular LUN 640A, or LUNs, of the storage system is provided through a secondary array controller 655.

In addition, storage system 620 includes remote host 620E that provides access to LUN 640A of the storage system 620 through its corresponding primary paths via primary array controller 650. For instance, one or more primary or active paths to LUN 640A may be defined as those serviced by host controller C-1 691 of remote host 620E, switch-1, and primary array controller 650.

As shown in FIG. 7, connectivity is lost between host controller C-1 681 of local host 620A and the primary array controller 650. For instance, host controller C-1 681 may have failed, or switch-1 may have failed, as highlighted by the bolded X covering path A. Connectivity failure may result in loss of one or more active paths by the local host 620A. There is also access to the secondary array controller via C-2 of the host 620A via switch-2. In addition, access to the primary array controller 650 is still provided by one or more remote hosts, such as, remote host 620E. As such, rather than initiating a cluster-wide failover protocol over to the secondary paths and the secondary host controllers C-2, I/Os may be shipped or redirected over path 670 over a secondary communication network (e.g., Ethernet/IP) from local host 620A to remote host 620E. In that manner, the redirected I/Os originating from local host 620A are delivered to the storage system 620, and more particularly to LUN 640A of storage system 620 via the primary array controller 650 without any reconfiguration of primary communication paths between remote host 620E and storage system 620. In still other embodiments, failover may be avoided if the failure is isolated to the local host. For instance, a cluster wide protocol may determine if the failure is local and not cluster-wide, such as in the case when there is an array port failure or scheduled maintenance. In cases where the failure is local, quiescing I/Os and failover may be avoided.

In still another embodiment, selection of a remote host to handle redirected I/Os from a local host, that has lost connectivity over one or more primary paths to a particular LUN of a storage system, includes giving priority to remote hosts of a site that includes the local host. A site includes one or more hosts that share a general geographic location, and are connected through a dedicated network links (e.g., cables or lines) providing superior performance. That is, in a campus cluster or local site environment, any storage that accessed over a secondary network using a I/O shipping framework to avoid a failover protocol, should be accessed preferably via hosts in the local site before considering hosts from any remote sites. In this embodiment, all host nodes are treated equally, and I/Os can be shipped or redirected any of the hosts in the site where connectivity to the storage system is available. By shipping redirected I/Os locally within a site, larger I/O shipping delays, link bandwidth starvation for other traffic, increased cost of third party bandwidth usage, etc. are avoided.

In addition, in another embodiment, based on an application specific policy, restriction of all storage access involving application data using an I/O shipping framework is to be done via other hosts in the local site only.

Figure 8:
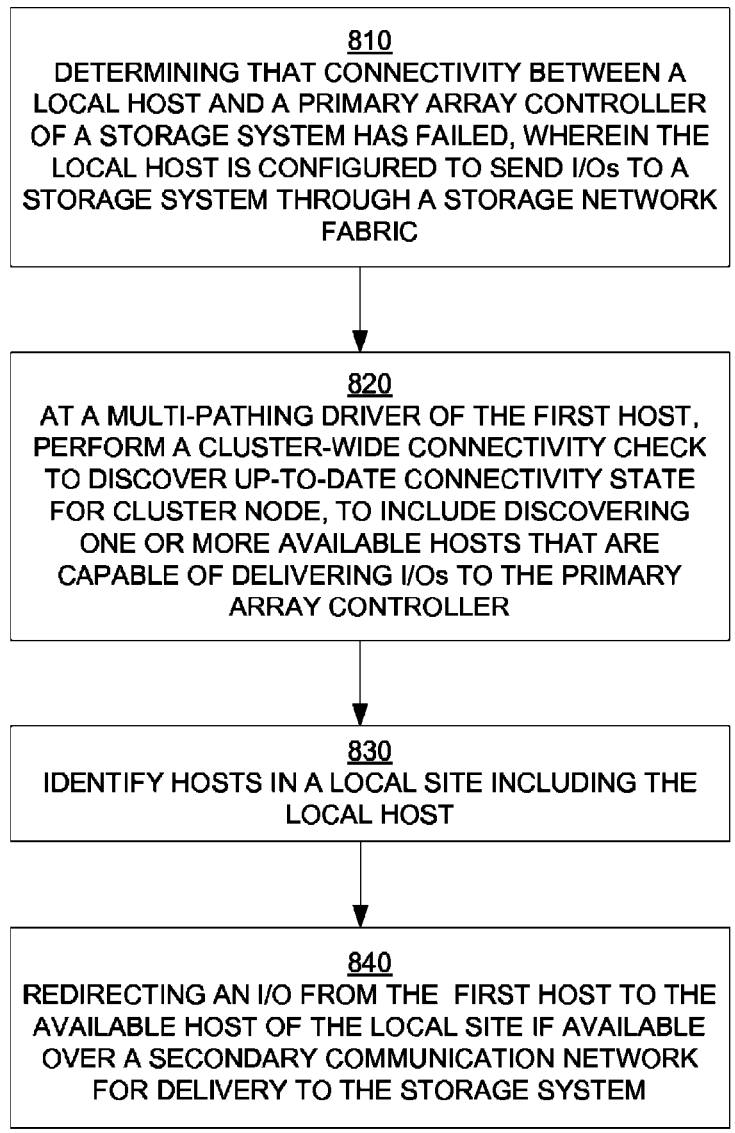
FIG. 8 is a flow diagram depicting a method for load balancing, in which an I/O is redirected from a local host to a remote host in a local site associated with the local host to avoid a failover protocol, in accordance with one embodiment of the present disclosure.

FIG. 8 is a flow diagram 800 depicting a computer implemented method for load balancing, in which an I/O is redirected from a local host to a remote host in a local site to avoid a failover protocol, in accordance with one embodiment of the present disclosure. In another embodiment, flow diagram 800 is implemented within a computer system including a processor and memory coupled to the processor and having stored therein instructions that, if executed by the computer system causes the system to execute the method for load balancing. In still another embodiment, instructions for performing the method are stored on a non-transitory computer-readable storage medium having computer-executable instructions for causing a computer system to perform a method for load balancing as outlined by flow diagram 800. The method outlined in flow diagram 800 is implementable by the multi-pathing driver 420 of the host device of FIG. 4, and as such is implemented at the LUN level of storage management, in one embodiment At 810, connectivity between a first host, or local host, and a primary array controller of a storage system is determined to be lost. The local host is configured to deliver and/or send I/Os to a storage system through a storage network fabric (e.g., Fibre Channel fabric switch network). For example, the local host is configured to deliver an I/O to a particular LUN of the storage system through the storage network fabric. More particularly, the connectivity has failed so that I/Os originating from the local host are undeliverable over the primary communication paths between the local host and the storage system. That is, connectivity has failed over at least one primary path between a host controller at the local host and the primary array controller of the storage system. Normally, a connectivity failure will trigger a cluster wide failover protocol, however, embodiments of the present disclosure are able to avoid the failover protocol, such as, when there is a connectivity failover that is isolated to a local host.

At 820, at a multi-pathing driver of the local host, a cluster-wide connectivity check is performed to obtain up-to-date connectivity state for all cluster hosts. In that manner, one or more available hosts are discovered that are capable of delivering I/Os to the primary array controller, for purposes of avoiding a failover protocol. The available hosts may include one or more remote hosts of a local site that also include the local host, and may include one or more remote hosts of one or more remote sites. These available hosts are configured for delivering I/Os to a particular LUN through the primary array controller, wherein the LUN is also accessed by the local host.

In one embodiment, the available hosts are discovered at the multi-pathing layer. That is, a multi-pathing discovery process is performed to discover a plurality of local and remote communication paths to the storage system, wherein the paths are configured for accessing the storage system through a storage network fabric. More particularly, the local host is configured to deliver I/Os to the storage system via one or more local paths that are discoverable, and one or more available hosts are configured to send I/Os, including redirected I/Os, to the storage system via one or more remote paths that are discoverable.

At 830, hosts in a local site are identified. In one embodiment, hosts of a local site are detected dynamically based on host-site configuration information located at the local host, or are explicitly set by a user through a list of allowed target nodes for each cluster node. For instance, a user can tag each host with a "site" attribute, and nodes with same site value are grouped together. Also, a user can explicitly specify a list of nodes that should be grouped together. In another embodiment, this information is dynamically inferred from I/O and/or network latency, such as, when measuring latency between nodes. If average latency to a subset of nodes is an order of magnitude less than the latency to other nodes, this subset of nodes belong to a "local" site, and other nodes belong to (one or more) "remote" site(s).

In another embodiment, storage is identified as belonging to specific sites. Storage is tagged by a user (at disk or enclosure or HBA level). Also, devices that have same "site" tag as local node can be considered to be at same site as host. In addition, storage latency is used to similarly classify "local" and "remote" storage. When performing I/O shipping, it is preferable to ship to a remote node that is in the same site as the storage in some embodiments.

At 840, an I/O from the local host is shipped or redirected to an available, remote host for purposes of delivering the I/O to the storage system over the storage network fabric. The I/O is redirected to the available, remote host through a secondary communication network. The secondary communication network is used primarily for host to host communication, and is used in embodiments of the present disclosure for redirecting I/O between hosts.

In one embodiment, if possible an I/O originating from the local host is shipped or redirected to an available, remote host that is included within a local site that is also associated with the local host. If there is no available host within the local site that can handle the I/O originating from the local host, then the I/O is shipped or redirected to an available, remote host of a remote site. Also, shipping to a remote site may not be desired under certain circumstances, such as, when the I/O is from an parallel application that can easily initiate the I/O on another node. Two considerations will drive the decision on whether to ship an I/O: bandwidth requirement (amount of I/O that is likely to follow will impose cost/performance penalties); and latency (I/O is latency sensitive, shipping it to another site cause unacceptable delays). If there is no available local or remote host to handle the I/O, then an I/O error is returned to the local host.

Redirecting the I/O to the available host is performed in order to avoid a failover operation that is triggered by a connectivity failure between a local host and the storage system. The connectivity failover may be isolated to the local host in that a primary path between the local host and the primary array controller has been lost. Though avoided by embodiments of the disclosure, a local failover protocol will switch access of the storage network through one or more secondary paths accessing the storage network through a secondary array controller when connectivity is lost over the primary path. In that case, a cluster-wide failover operation is typically performed to align all hosts accessing a particular LUN with the secondary array controller for efficiency purposes. However, embodiments of the present disclosure are able to avoid performing the failover protocol by redirecting the I/O to an available, remote host that is preferably found in the local site associated with the local host. In that case, the failover protocol or operation is disabled.

Thus, according to embodiments of the present disclosure, systems and methods are described in which I/Os from a local host are redirected to an available, remote host that is capable of delivering I/Os to a primary array controller of a storage system in order to avoid implementation of a failover protocol when connectivity from the local host to the primary array controller is lost.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered as examples because many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. These software modules may configure a computing system to perform one or more of the example embodiments disclosed herein. One or more of the software modules disclosed herein may be implemented in a cloud computing environment. Cloud computing environments may provide various services and applications via the Internet. These cloud-based services (e.g., software as a service, platform as a service, infrastructure as a service, etc.) may be accessible through a Web browser or other remote interface. Various functions described herein may be provided through a remote desktop environment or any other cloud-based computing environment.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as may be suited to the particular use contemplated.

Embodiments according to the present disclosure are thus described. While the present disclosure has been described in particular embodiments, it should be appreciated that the disclosure should not be construed as limited by such embodiments, but rather construed according to the below claims.

The invention claimed is:

1. A computer implemented method for load balancing, comprising:
    determining that connectivity between a first host and a primary array controller of a storage system has failed, wherein said first host is configured to send input/output (I/O) messages to said storage system through a storage network fabric;
    at a multi-pathing driver of said first host, discovering an available second host that is capable of delivering I/O messages to said primary array controller; and
    redirecting an I/O message from said first host to said available second host over a secondary communication network, separate from said storage network fabric, for delivery to said storage system.

2. The computer implemented method of claim 1, further comprising:
    discovering a plurality of local and remote communication paths to said storage system through a plurality of hosts through a multi-pathing discovery process, wherein said plurality of hosts is configured for accessing said storage system through the storage network fabric, wherein said first host is configured to send I/O messages to said storage system via one or more local paths, and wherein one or more available second hosts are configured to send I/O messages to said storage system via one or more remote paths.

3. The computer implemented method of claim 1, further comprising:
    sending said I/O message to said storage system from said available second host on behalf of said first host.

4. The computer implemented method of claim 1, further comprising:
    disabling a failover operation triggered by said connectivity failure.

5. The computer implemented method of claim 1, further comprising:
   receiving a response message over said secondary communication network from said storage system via said available second host, wherein said response message is delivered in association with said I/O message.

6. The computer implemented method of claim 1, wherein said determining an available second host further comprises:
   determining I/O characteristics for a plurality of hosts in reference to said first host; and
   selecting said available second host based on said I/O characteristics.

7. The computer implemented method of claim 6, further comprising:
   determining remote I/O characteristics of one or more available second hosts configured to deliver I/O messages to said storage system over one or more remote paths through said storage network fabric, wherein said remote I/O characteristics comprises I/O throughput from a corresponding available second host and network latency between said first host and said corresponding available second host.

8. A computer system, comprising:
   a processor; and
   memory coupled to said processor and having stored therein instructions that, if executed by said computer system, cause said computer system to execute a method for load balancing, comprising:
      determining that connectivity between a first host and a primary array controller of a storage system has failed, wherein said first host is configured to send input/output (I/O) messages to said storage system through a storage network fabric;
      at a multi-pathing driver of said first host, discovering an available second host that is capable of delivering I/O messages to said primary array controller; and
      redirecting an I/O message from said first host to said available second host over a secondary communication network, separate from said storage network fabric, for delivery to said storage system.

9. The computer system of claim 8, wherein said method further comprises:
   discovering a plurality of local and remote communication paths to said storage system through a plurality of hosts through a multi-pathing discovery process, wherein said plurality of hosts is configured for accessing said storage system through said storage network fabric, wherein said first host is configured to send I/O messages to said storage system via one or more local paths, and wherein one or more available second hosts are configured to send I/O messages to said storage system via one or more remote paths.

10. The computer system of claim 8, wherein said method further comprises:
    sending said I/O message to said storage system from said available second host on behalf of said first host.

11. The computer system of claim 8, wherein said method further comprises:
    disabling a failover operation triggered by said connectivity failure.

12. The computer system of claim 8, wherein said method further comprises:
    receiving a response message over said secondary communication network from said storage system via said available second host, wherein said response message is delivered in association with said I/O message.

13. The computer system of claim 8, wherein said determining an available second host in said method further comprises:
    determining I/O characteristics for a plurality of hosts in reference to said first host; and
    selecting said available second host based on said I/O characteristics.

14. A non-transitory computer-readable storage medium having computer-executable instructions for causing a computer system to perform a method for load balancing, comprising:
    determining that connectivity between a first host and a primary array controller of a storage system has failed, wherein said first host is configured to send input/output (I/O) messages to said storage system through a storage network fabric;
    at a multi-pathing driver of said first host, discovering an available second host that is capable of delivering I/O messages to said primary array controller; and
    redirecting an I/O message from said first host to said available second host over a secondary communication network, separate from said storage network fabric, for delivery to said storage system.

15. The computer-readable storage medium of claim 14, wherein said method further comprises:
    discovering a plurality of local and remote communication paths to said storage system through a plurality of hosts through a multi-pathing discovery process, wherein said plurality of hosts is configured for accessing said storage system through said storage network fabric, wherein said first host is configured to send I/O messages to said storage system via one or more local paths, and wherein one or more available second hosts are configured to send I/O messages to said storage system via one or more remote paths.

16. The computer-readable storage medium of claim 14, wherein said method further comprises:
    sending said I/O message to said storage system from said available second host on behalf of said first host.

17. The computer-readable storage medium of claim 14, wherein said method further comprises:
    disabling a failover operation triggered by said connectivity failure.

18. The computer-readable storage medium of claim 14, wherein said method further comprises:
    receiving a response message over said secondary communication network from said storage system via said available second host, wherein said response message is delivered in association with said I/O message.

19. The computer-readable storage medium of claim 14, wherein said determining an available second host in said method further comprises:
    determining I/O characteristics for a plurality of hosts in reference to said first host; and
    selecting said available second host based on said I/O characteristics.

20. The computer-readable storage medium of claim 19, wherein said discovering an available second host in said method further comprises:
    at said multi-pathing driver, determining global I/O characteristics for each LUN of said storage system, wherein said I/O characteristics are collected periodically across corresponding multi-pathing drivers of said plurality of hosts; and selecting said available second host based on said global I/O characteristics or by user selection.

* * * * *